April 22, 1930.  L. J. SCHETTL  1,755,337
ANIMAL FEEDER
Filed July 28, 1927  2 Sheets-Sheet 1

Witnesses
F. C. Nachman

INVENTOR.
Louis J. Schettl.
BY Richard B. Owen
ATTORNEY.

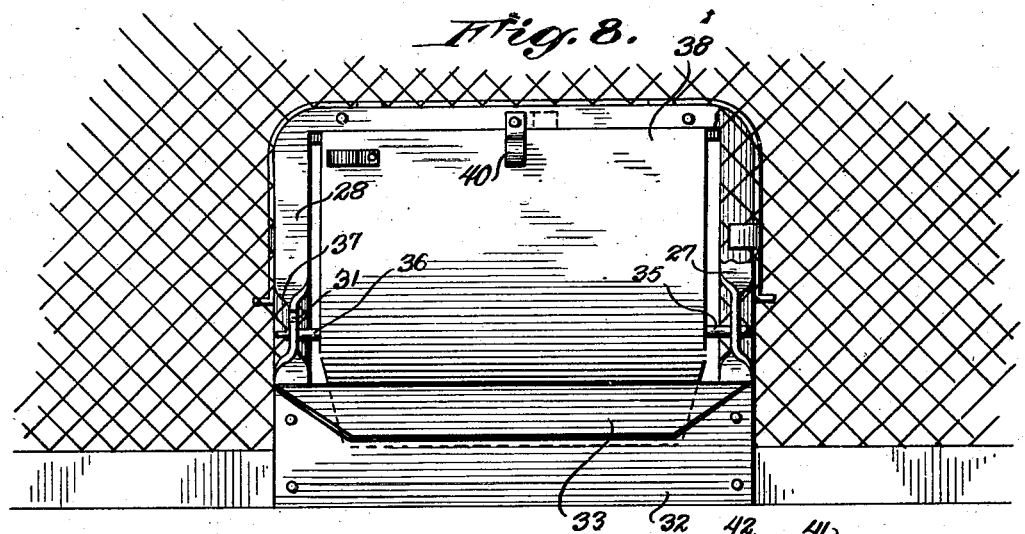
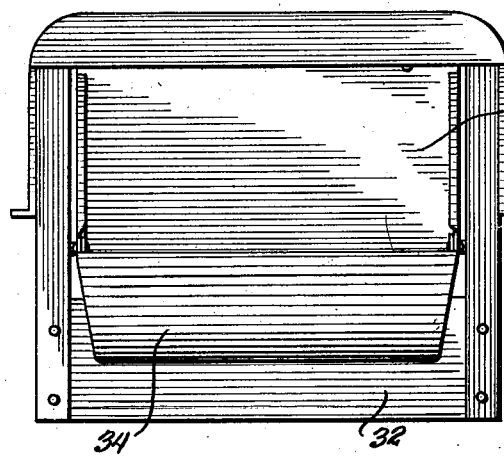
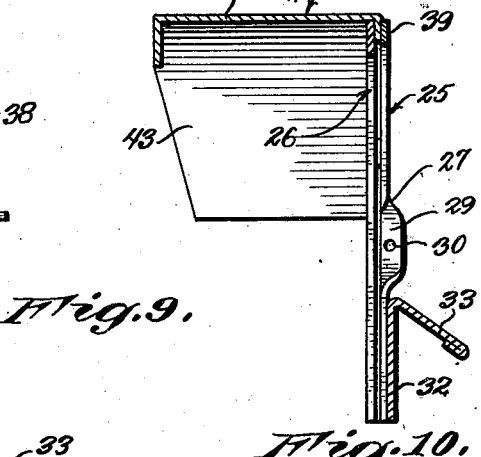
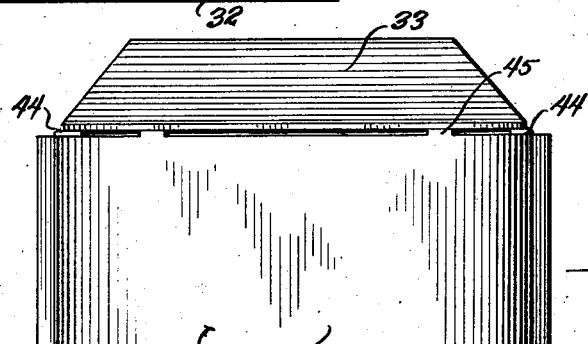

Patented Apr. 22, 1930

1,755,337

UNITED STATES PATENT OFFICE

LOUIS J. SCHETTL, OF MANITOWOC, WISCONSIN

ANIMAL FEEDER

Application filed July 28, 1927. Serial No. 209,098.

This invention relates to the class of animal husbandry and pertains particularly to an improved type of feeder.

The primary object of the present invention is to provide, in a manner as hereinafter set forth, a feeder which can be easily placed in any desired position in a fence or wall and so contructed that ready access can be had thereto from the exterior of the wall or fence in which the feeder is set to replenish the contents thereof or to completely dump the same for cleaning, as desired.

Another object of the invention is to provide an animal feeder which can be readily re-stocked without the necessity of entering the animal pen or house and without the danger of the animals escaping from confinement, and which will be clean and sanitary and easily removable for repair or replacement.

Numerous other objects and advantages of the present invention will become apparent as the description of the same proceeds and the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention expressed in the appended claim.

In the drawings:

Figure 8 is a rear elevational view of a modified construction of feeder designed to be secured directly to a fence wire structure.

Figure 9 is a front elevational view of the modified structure.

Figure 10 is a transverse section through the supporting frame and hood of the modified structure with trough removed.

Figure 11 is a plan view of the structure shown in Figure 10.

Figure 1:
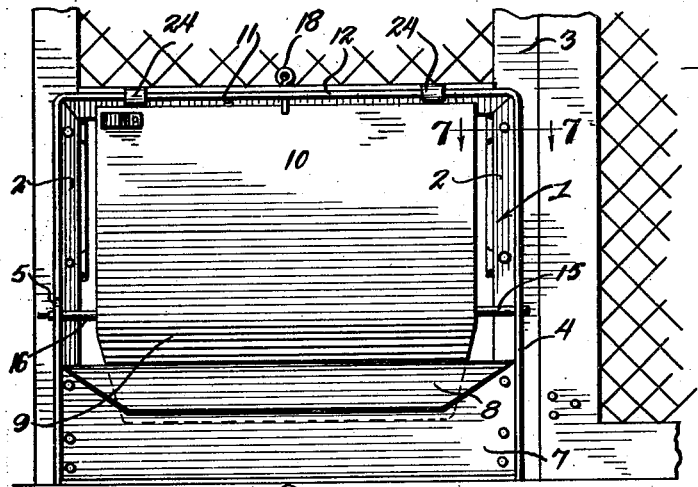
Figure 1 shows the present invention in rear elevation and in position in the lower portion of a gate.
Figure 7:
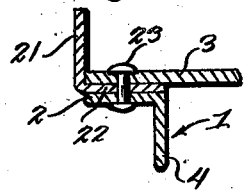
Figure 7 is a detailed section taken substantially upon the line 7—7 of Figure 1.
Figure 2:
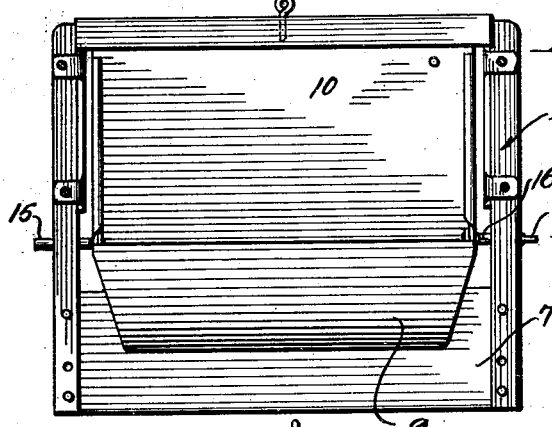
Figure 2 is a front elevation of the feeder structure per se.

Referring now to the drawings in detail wherein like numerals of reference indicate corresponding part throughout the several views, the numeral 1 indicates a frame of substantially inverted U shaped configuration, formed of angle iron material as shown and designed to have the sides 2 secured in the frame strips 3 of a fence gate or other rigid portion of a fence or to the sides of a wall through which an opening has been formed, with the other flanges 4 projecting from the outer face of the strips or the wall as the case may be. The outwardly projecting side flanges 4 of the frame 1 are provided one with an aperture and the other with an inwardly and downwardly directed slot 5 which slot terminates at its lower end in a circular recess 6, the purpose for which will become apparent as the description proceeds.

The lower portion of the frame 1 has extended therefrom the wall plate 7 the end edges of which are secured to side flanges 2 of the frame and this plate 7 has projecting outwardly from the top edge thereof the downwardly inclined apron 8.

Figure 3:
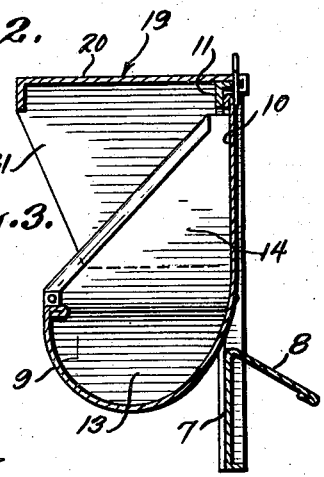
Figure 3 is a vertical transverse section of the structure.

Arranged forwardly of the frame 1 is a trough 9 which is substantially halfway below the top edge of the plate 7 as shown and which has the extended back wall portion 10 projecting upwardly from one longitudinal edge, between the side members of the frame, substantially in the same plane as the wall plate 7, the top edge of this back wall abutting the depending flange portion 11 of the top rail 12 of the frame 1 as is shown in Figure 3. Each end wall 13 of the trough 9 is extended upwardly to a point adjacent the top edge of the back wall 10 as shown in Figure 3 and the front edges of these extended portions 14 of the walls 13 are rearwardly inclined as shown.

Figure 4:
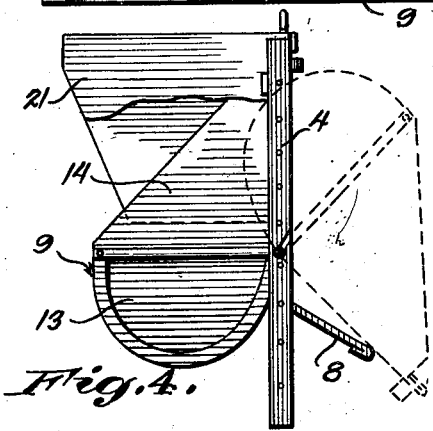
Figure 4 is an end elevational view with a portion of the covering hook broken away.
Figures 5, 6:
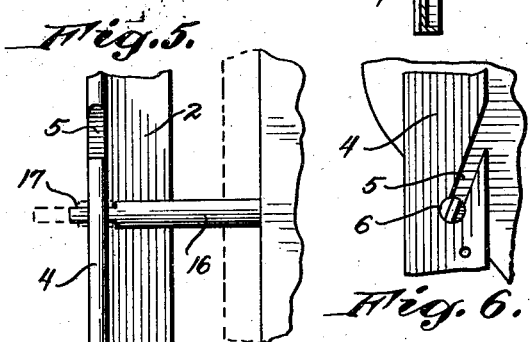
Figure 5 is a detailed front elevation of a supporting trunnion.
Figure 6 is a side elevational view of the supporting trunnion.

Projecting laterally from each end wall of the trough 9 adjacent the back wall thereof is a trunnion pin, one of which is indicated by the numeral 15 while the other is indicated by the numeral 16. The trunnion 15 is designed to engage the aforementioned apertures in the outwardly projecting side flange 4 of the frame while the trunnion 16 is designed to be rotatably mounted in the circular recess 6 at the inner end of the slot 5 and is inserted into the recess or removed therefrom through the use of the flattened portion 17 at the free end of the trunnion 16 as shown in Figure 5. This insertion of the trough is accomplished by first inserting the trunnion 15 in its aperture with the trough moved as close as possible to the side bar of the frame engaged by the trunnion 15 and tilted outwardly as indicated in dotted lines in Figure 4 whereupon the flattened portion 17 of the trunnion 16 will be in position to fit into the slot 5 and when in the bottom of the same may be shifted laterally with the trough to position the round portion of the trunnion in the circular recess 6 whereupon the trough can be swung upwardly to the operative position shown. The pin member 18 is extended through the top rail 12 of the frame to engage behind the top edge of the trough's back wall 10 to maintain the trough in set position. As is clearly shown in Figure 4 when the trough is tilted outwardly the back wall 10 will rest against the apron 8 and the trough will be in such position that the entire contents thereof will be dumped.

If desired where the trough is to be used out of doors, the hood member 19 may be placed thereover and this hood comprises the top portion 20 having depending end walls 21 the rear edges of which end walls are provided with the laterally projecting ears 22 which are engaged between the side members 3 of the fence gate or a building wall as the case may be and the adjacent side members of the frame 1. If desired the rivet member 23, by means of which the frame 1 is secured to the gate members, may be passed through these ears to permanently fix the hood in position or, the hood may be held between the side rail of the gate and the side members of the frame by friction alone. To further secure the hood 19 in position the rear edge of the top 20 may be provided with a pair of hook members 24 for engagement over the free edge of the portion 12 of the top rail of the frame 1.

In the modified structure shown in the figures 8 to 11, a pair of inverted substantially U shaped frames 25 and 26 are provided which are arranged in face opposed relation when the device is set up. This structure, as before explained is designed to be placed in an opening formed directly in the wire of an inclosure and as will be understood from the showing of Figure 8 the edges of the wire surrounding the opening are clamped between the frames 25 and 26.

The inner plate 26 is flat throughout whereas the side portions 27 and 28 are provided with a twist intermediate their ends as indicated by the numeral 29, to present a portion of one edge of the members 27 and 28 to the rear of the feeder. The twisted portion 29 in the side member 27 is provided with an aperture 30 whereas the rearwardly facing edge of the twisted portion of the side member 28 is provided with a slot 31 of the same form as the slot 5 in the previously described type.

The outer frame 25 has the plate 32 secured across the lower portion thereof and connecting the lower ends of the side members 27 and 28 and the upper edge of this plate has extended outwardly and downwardly therefrom the apron 33.

A trough 34 is of substantially the same configuration as the trough 9 shown in Figure 3, is provided at its rear with the laterally projecting trunnion 35 and 36, the trunion 35 being extensible through the opening 30 in the side member 27 while the trunnion 36 has the terminal portion flattened as indicated at 37 to facilitate application of the frame in the manner described in connection with Figures 1 to 6 inclusive, the inner portion of the trunnion 36 being circular in cross section and extensible laterally into the circular lower end or inner end of the slot 31.

The trough 34 has the rear upwardly extending back 38 which is of sufficient height to close the space between the side members 27 and 28 and the top portion of the frame 25, the top edge of the back 38 being in alignment with the inner edge of this frame when the trough is in operative position. In order to maintain the trough in this position the bar 38 of the frame 25 is provided with a swinging catch 40 which can be swung down over the bar 38 to prevent the same from moving out of position.

In order to protect the contents of the trough 34 a hood 41 is provided which includes a top 42, the end wings or walls 43 and the engaging lugs 44 and 45, the lugs 45 being along the rear edge of the top 42 while the lugs 44 are positioned along the edges of the end walls 43. These lugs 44 and 45 are designed to engage between the frames 25 and 26 and are clamped thereby when the frames are secured together in clamping position on either side of the wire of the fence.

From the foregoing description it will be readily seen that the feeding device described, when set up in position, can be easily swung outwardly to dump the old feed and can also be easily restocked with fresh feed without the possibility of the animals escaping from confinement and without the necessity of the attendant entering the inclosure in which the animals are kept.

Having thus described my invention what I claim is:

An animal feeder comprising a frame, a trough, means pivotally connecting the trough at its upper rear edge to the lateral sides of the frame and below the upper side of the frame, a wall extending upwardly from said edge of the trough to close the frame above the trough, said wall contacting with the frame to support the trough in operative position, walls extending upwardly from the end walls of the trough, and a hood secured to the frame and having a top portion overlying the trough and end portions arranged laterally beyond and in overlapping relation to the walls extending upwardly from the end walls of the trough.

In testimony whereof I affix my signature.

LOUIS J. SCHETTL.